United States Patent [19]

Opprecht

[11] 4,051,343
[45] Sept. 27, 1977

[54] WELDING HEAD FOR RESISTANCE - WELDING MACHINE

[76] Inventor: Paul Opprecht, Im hinteren Bernold, 8962 Bergdietikon, Switzerland

[21] Appl. No.: 637,683

[22] Filed: Dec. 4, 1975

[30] Foreign Application Priority Data

Dec. 6, 1974 Germany .............................. 2457684

[51] Int. Cl.² ............................................ B23K 11/06
[52] U.S. Cl. ........................................ 219/84; 219/81
[58] Field of Search ........................... 219/81, 59, 84; 339/118 RY

[56] References Cited

U.S. PATENT DOCUMENTS

| 1,553,728 | 9/1925 | Sjobring | 219/84 |
| 3,267,253 | 8/1966 | Gueugnier | 219/84 |

OTHER PUBLICATIONS

Le Soudage Electrique et son, Application a La Construction Aeronautique by Moresse, Girardot & Cie, Paris, 1954, p. 103.

*Primary Examiner*—E. A. Goldberg
*Attorney, Agent, or Firm*—McNenny, Pearne, Gordon, Gail, Dickinson & Schiller

[57] ABSTRACT

A resistance-welding head having a vertical-axis rotor with a roller electrode attached to the lower end thereof. Current is supplied to the roller electrode by means of a mercury-filled interstice formed between the walls of a chamber within the rotor and a current-transmission rod disposed within the chamber. The rod may be provided with a bore for receiving the mercury and having a stopper which also serves as a mercury-level indicator.

2 Claims, 1 Drawing Figure

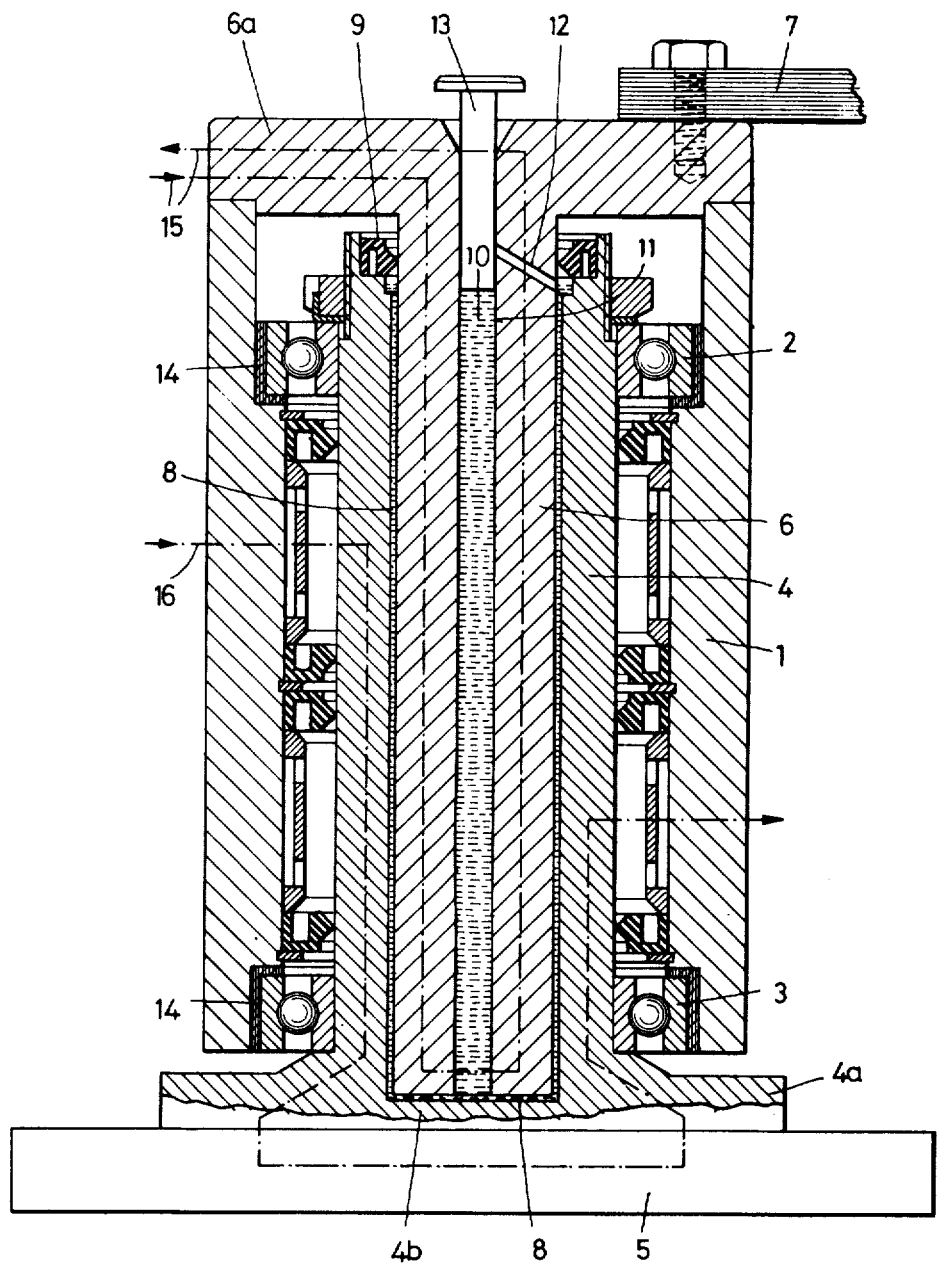

WELDING HEAD FOR RESISTANCE - WELDING MACHINE

This invention relates to a welding head for resistance-welding machines utilizing a welding current, the head comprising a current lead, a housing adapted for the connection of the current lead, a vertical-axis rotor having a lower end and a body mounted rotatingly and non-displaceably in the housing, a roller electrode attached to the lower end of the rotor, and means for supplying the welding current to the roller electrode through the rotor body, these means comprising an interstice filled with mercury.

A similar welding head, but intended for horizontal-axis arrangement, is described in the book entitled *Le Soudage electrique et son application a la construction aeronautique*, by G. Moresse (Publisher: Librairie des Sciences Girardot & Cie., 27, Quai des Grands Augustins, Paris VIe), 1954 ed., page 103. In this known welding head, a current-conducting ring, snugly fitted on the rotor body, rotates in an annular chamber, leaving a gap which is partially filled with mercury. The annular chamber is provided in the bearing body or in a separate body intended for supplying electric current.

German Disclosed Application No. 1,565,797 teaches a welding head having a horizontal-axis rotor in which there is a similar mercury-filled interstice between a lengthwise section of a rotor shaft and a median section of a bearing body in whose end sections the rotor shaft is mounted.

In this known design, special sealing means must be used for sealing off the interstice at both ends; not only is the operating reliability of the sealing means never completely guaranteed, but they also require frequent maintenance. Moreover, based on a maximum current density in the mercury, the relatively short length of the interstice surrounding the ring means that the welding-current intensity is limited accordingly.

German Disclosed Application No. 1,765,435 describes a roller electrode design in which the roller electrode is mounted at both ends on a stator serving for the current feed and is divided and provided with an annular recess approximately midway along its length. An annular projection of the stator is disposed in this recess, so that there is an annular interstice; this interstice contains mercury. In this known design, too, the difficulties of reliable sealing of the interstice exist.

German Pat. No. 350,441 discloses a weldinghead arrangement in which the axis of rotation of the rotor is at least substantially vertical and which has a roller electrode situated at the lower end of the rotor.

It is an object of this invention to provide an upright welding head of the type initially described which practically completely eliminates the problem of reliable sealing of a mercury-filled interstice between the stator and the rotor and in which, for a certain given size, a considerably greater welding current can be supplied to the roller electrode without increasing the current load of the mercury, owing to a greater length of the mercury-filled interstice. To this end, the welding head according to the present invention further comprises a cylindrical central chamber having a wall surface and a base and extending through almost the entire length of the rotor body, and a current-transmission rod secured to the housing and extending downwards through the central chamber almost to its base, the interstice being formed between the wall surface of the chamber and the current-transmission rod.

In this manner there is no need to provide independent seals between the current-transmission rod and the rotor body adjacent the base.

A preferred embodiment of the invention will now be described in detail with reference to the accompanying drawing, the sole FIGURE of which is a diagrammatical longitudinal section through this embodiment.

In a housing 1, a rotor body 4, which is for the most part cylindrical, is rotatingly and non-displaceably mounted about a substantially vertical axis by means of insulating rings 14 and two ball bearings 2 and 3. At the lower end of the rotor body 4 is a flange 4a to which a roller electrode 5 is detachably secured by means of screws (not shown).

Secured to the top of the housing 1 is a flange 6a which is formed in one piece with and at the top of a current-transmission rod 6, and to which a welding-current lead 7 is connected. The current-transmission rod 6, which is cylindrical and flat at the bottom, projects downwardly for almost its entire length into a cylindrical central chamber which extends through the rotor body 4 almost to the bottom thereof, i. e., down to its flat base 4b, leaving a narrow gap or interstice 8 which is practically completely filled with mercury 10. The interstice 8 is closed off at its upper end by a simple lipped washer 9. The mercury 10 has been poured in through a continuous central filling bore 11, the air thus displaced having been able to escape through a bore 12 leading out of the top of the interstice 8. A plug 13, slidingly inserted in the upper end portion of the filling bore 11 and projecting up out of the bore 11, rests upon the free surface of the mercury 10; thus the plug 13 serves simultaneously as a stopper and as a mercury-level indicator. It will be understood that the stator and the rotor are liquid-cooled in the conventional manner; a coolant circuit for the stator is indicated by a dot-dash line 15, and a coolant circuit for the rotor is indicated by a dot-dash line 16.

What is claimed is:

1. A welding head adapted for use in a vertical orientation in resistance-welding machines utilizing a welding current, said head comprising a current lead, a housing adapted for the connection of said current lead, a vertical-axis rotor having a lower end and a body mounted rotatingly and non-displaceably in said housing, a roller electrode attached to said lower end of said rotor, and means for supplying said welding current to said roller electrode through said rotor body, said means comprising an interstice filled with mercury, said welding head further comprising a cylindrical central chamber having a wall surface and a base, the base being located adjacent said lower end and extending through almost the entire length of said rotor body, and a current-transmission rod secured to said housing and extending downwards through said central chamber almost to said base thereof, said interstice being formed within said cylindrical central chamber between said wall surface and base thereof and said current-transmission rod free of fluid seals adjacent the lower end portions of said interstice.

2. A welding head in accordance with claim 1, further comprising a mercury-fill bore extending through the entire length of said current transmission rod and having an upper end portion, and a stopper slidingly inserted in and projecting from said upper end portion, said stopper serving simultaneously as a mercury-level indicator.

* * * * *